United States Patent
Lum et al.

(10) Patent No.: US 9,943,756 B2
(45) Date of Patent: *Apr. 17, 2018

(54) SYSTEM FOR ASSOCIATING A WIRELESS DEVICE TO A CONSOLE DEVICE

(71) Applicant: MICROSOFT TECHNOLOGY LICENSING, LLC, Redmond, WA (US)

(72) Inventors: Richard S. Lum, Redmond, WA (US); Wei Guo, Redmond, WA (US); Gary L. Gordon, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 102 days.

This patent is subject to a terminal disclaimer.

(21) Appl. No.: 15/042,735

(22) Filed: Feb. 12, 2016

(65) Prior Publication Data

US 2016/0158642 A1    Jun. 9, 2016

Related U.S. Application Data

(63) Continuation of application No. 11/283,442, filed on Nov. 18, 2005, now Pat. No. 9,289,678, which is a
(Continued)

(51) Int. Cl.
*A63F 13/00* (2014.01)
*A63F 13/235* (2014.01)
(Continued)

(52) U.S. Cl.
CPC ............ *A63F 13/235* (2014.09); *A63F 13/06* (2013.01); *A63F 13/22* (2014.09); *A63F 13/26* (2014.09);
(Continued)

(58) Field of Classification Search
CPC ....... H04W 88/02; H04B 1/715; H04B 1/713; A63F 13/22; A63F 13/235; A63F 13/71;
(Continued)

(56) References Cited

U.S. PATENT DOCUMENTS

| 5,759,100 A | 6/1998 | Nakanishi |
| 6,028,853 A | 2/2000 | Haartsen |

(Continued)

FOREIGN PATENT DOCUMENTS

| CN | 1178478 A | 4/1998 |
| CN | 1466478 A | 1/2004 |

(Continued)

OTHER PUBLICATIONS

In the United States Patent and Trademark Office, Final Office Action in U.S. Appl. No. 11/034,641, filed Jan. 12, 2005, dated Aug. 12, 2008, 8 pages.
(Continued)

*Primary Examiner* — Jay Liddle
*Assistant Examiner* — Alex F. R. P. Rada, II
(74) *Attorney, Agent, or Firm* — Baker & Hostetler LLP

(57) ABSTRACT

Systems and methods for associating a wireless device to a host. The wireless device is associated to the host via a binding and discovery process. The binding process establishes the association. A unique identifier and other binding information is provided to the wireless device, which is stored in the wireless device to establish the link to the console. The binding information is retained in the wireless device. The discovery process enables the wireless device to join a session at hosted by the host. The host sends broadcast packets that are compared to the stored information in the wireless device. The broadcast packets are validated and authenticated to complete the discovery process. A visual
(Continued)

indicator on the host and/or controller may indicate the success or failure of either the binding or discovery process.

20 Claims, 8 Drawing Sheets

Related U.S. Application Data continuation-in-part of application No. 11/034,641, filed on Jan. 12, 2005, now Pat. No. 8,369,795.

(51) Int. Cl.
    *A63F 13/71*       (2014.01)
    *A63F 13/20*       (2014.01)
    *G07F 17/32*       (2006.01)
    *A63F 13/26*       (2014.01)
    *A63F 13/22*       (2014.01)

(52) U.S. Cl.
    CPC .......... *A63F 13/71* (2014.09); *G07F 17/3209* (2013.01); *G07F 17/3227* (2013.01); *A63F 2300/1031* (2013.01); *A63F 2300/1043* (2013.01); *A63F 2300/301* (2013.01); *A63F 2300/402* (2013.01)

(58) Field of Classification Search
    CPC ............... A63F 13/493; A63F 13/12; A63F 2300/1031; A63F 2300/1025; A63F 2300/552; H04L 63/105; H04L 69/40
    See application file for complete search history.

(56) References Cited

U.S. PATENT DOCUMENTS

| | | | |
|---|---|---|---|
| 6,088,516 A | 7/2000 | Kreisel et al. | |
| 6,127,961 A | 10/2000 | Stacy et al. | |
| 6,213,879 B1 | 4/2001 | Niizuma et al. | |
| 6,213,880 B1 | 4/2001 | Sim | |
| 6,241,612 B1 | 6/2001 | Heredia | |
| 6,304,250 B1 | 10/2001 | Yang et al. | |
| 6,324,603 B1 | 11/2001 | Niizuma et al. | |
| 6,402,616 B1 | 6/2002 | Ogata et al. | |
| 6,468,160 B2 | 10/2002 | Eliott | |
| 6,529,119 B1 | 3/2003 | Kumar et al. | |
| 6,544,124 B2 | 4/2003 | Ireland et al. | |
| 6,683,886 B1 | 1/2004 | van der Tuijn et al. | |
| 6,684,062 B1 | 1/2004 | Gosior et al. | |
| 6,712,704 B2 | 3/2004 | Elliott | |
| 6,769,989 B2 | 8/2004 | Smith et al. | |
| 6,872,139 B2 | 3/2005 | Sato et al. | |
| 6,878,066 B2 | 4/2005 | Leifer et al. | |
| 6,939,232 B2 | 9/2005 | Tanaka et al. | |
| 7,175,529 B2 | 2/2007 | Hartman et al. | |
| 7,181,370 B2 | 2/2007 | Furem et al. | |
| 7,254,159 B1 | 8/2007 | Lavelle et al. | |
| 7,290,072 B2 | 10/2007 | Quraishi et al. | |
| 2002/0065065 A1 | 5/2002 | Lunsford et al. | |
| 2002/0072410 A1 | 6/2002 | Tanaka et al. | |
| 2002/0159434 A1 | 10/2002 | Gosior et al. | |
| 2003/0050009 A1 | 3/2003 | Kurisko et al. | |
| 2003/0104865 A1 | 6/2003 | Itkis et al. | |
| 2003/0206157 A1 | 11/2003 | Emerson | |
| 2003/0216178 A1 | 11/2003 | Danieli et al. | |
| 2004/0009815 A1 | 1/2004 | Zotto et al. | |
| 2004/0023721 A1 | 2/2004 | Giobbi | |
| 2004/0110563 A1 | 6/2004 | Tanaka et al. | |
| 2004/0162137 A1 | 8/2004 | Eliott | |
| 2004/0224768 A1 | 11/2004 | Hussaini et al. | |
| 2004/0235566 A1 | 11/2004 | Hussaini et al. | |
| 2005/0096086 A1 | 5/2005 | Singamsetty | |
| 2005/0122948 A1 | 6/2005 | Miyazaki | |
| 2005/0169252 A1 | 8/2005 | Riggs | |
| 2005/0206618 A1 | 9/2005 | Lee et al. | |
| 2005/0215321 A1 | 9/2005 | Hussaini et al. | |
| 2005/0221895 A1 | 10/2005 | Lum et al. | |
| 2005/0245316 A1 | 11/2005 | Tanaka et al. | |
| 2005/0260996 A1 | 11/2005 | Groenendaal | |
| 2006/0084504 A1 | 4/2006 | Chan et al. | |
| 2006/0111180 A1 | 5/2006 | Cheng | |
| 2006/0154725 A1 | 7/2006 | Glaser et al. | |
| 2006/0195522 A1 | 8/2006 | Miyazaki | |
| 2006/0262759 A1 | 11/2006 | Bahl et al. | |

FOREIGN PATENT DOCUMENTS

| | | |
|---|---|---|
| EP | 1475131 A1 | 11/2004 |
| EP | 1475688 A2 | 11/2004 |
| EP | 1475690 A2 | 11/2004 |
| EP | 1583317 A1 | 10/2005 |
| EP | 1583321 A1 | 10/2005 |
| EP | 1662707 A1 | 5/2006 |
| EP | 1681658 A2 | 7/2006 |
| GB | 2374491 A | 10/2002 |
| JP | 05-056191 | 3/1993 |
| JP | 08-309031 | 11/1996 |
| JP | 08-331201 | 12/1996 |
| JP | 10-042062 | 2/1998 |
| JP | 2000-126445 | 5/2000 |
| JP | 2001-501432 | 1/2001 |
| JP | 2001-224857 | 8/2001 |
| JP | 2002-140154 | 5/2002 |
| JP | 2002-202836 | 7/2002 |
| JP | 2002-202843 | 7/2002 |
| JP | 2002-223266 | 8/2002 |
| JP | 2002-224449 | 8/2002 |
| JP | 2002-281048 | 9/2002 |
| JP | 2003-023391 | 1/2003 |
| JP | 2003-210865 | 7/2003 |
| JP | 2004-005507 | 1/2004 |
| JP | 2004-329915 | 11/2004 |
| JP | 2005-217646 | 8/2005 |
| JP | 2005-288161 | 10/2005 |
| JP | 2005-288180 | 10/2005 |
| KR | 10-2005-0078226 | 8/2005 |
| WO | WO 1992/008195 | 5/1992 |
| WO | WO 1999/007113 | 2/1999 |
| WO | WO 2001/066209 | 9/2001 |
| WO | WO 2002/036226 | 5/2002 |
| WO | WO 2003/071706 | 8/2003 |
| WO | WO 2005/008966 | 1/2005 |

OTHER PUBLICATIONS

EP Application No. 05112391: Extended European Search Report dated May 25, 2010, 5 pages.
Dideles, M., "Bluetooth: A Technical Overview", XRDS Crossroads: the ACM Magazine for Students, http://xrds.acm.org/article.cfm?aid=904083, Jun. 2003, 9(4), 16 pages.
European Application No. 06836859.6: Extended European Search Report, dated Sep. 13, 2011, 10 pages.
EP Application No. 06826258: Extended European Search Report, dated Sep. 15, 2010, 8 pages.
Teamxbox, "Logitech Cordless Headset Review (Xbox)", http:-hardware.teambox.com-reviews-xbox-23.Logitech-Cordless-Headset-p1-, accessed Aug. 19, 2010, 1-3.
European Patent Application No. 15201554.1; Supplemental Search Report; dated Jul. 11, 2016; 5 pages.
International Patent Application No. PCT/US2006/042908; Int'l Preliminary Report on Patentability; dated May 20, 2008; 5 pages.
International Patent Application No. PCT/US2006/042908; Int'l Search Report and the Written Opinion; dated Apr. 3, 2007; 10 pages.

SYSTEM FOR ASSOCIATING A WIRELESS DEVICE TO A CONSOLE DEVICE

CROSS-REFERENCE TO RELATED APPLICATIONS

The present invention is a continuation of U.S. patent application Ser. No. 11/283,442 filed on Nov. 18, 2005, which is a continuation-in-part of U.S. patent application Ser. No. 11/034,641 filed on Jan. 12, 2005, now U.S. Pat. No. 8,369,795, issued on Feb. 5, 2013, entitled "Game Console Notification System," which is incorporated herein by reference in its entirety.

COPYRIGHT NOTICE/PERMISSION

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings hereto: Copyright© 2005, Microsoft Corporation, All Rights Reserved.

TECHNICAL FIELD

This invention generally relates to the field of gaming and multimedia devices. In particular, the present invention is directed to a system and method of associating a wireless device to a console device.

BACKGROUND

Wireless controllers provide players with freedom of movement by wirelessly connecting the controller to the gaming console. Typically, the controllers provide features such as vibration feedback, mini-joysticks, D-pad, pressure-sensitive buttons, etc. that players would find on wired controllers. In addition, the systems that connect wireless controllers to gaming consoles often allow multiple players to play at once on the console.

Conventional wireless controllers are not easily managed where there may be many wireless controllers and gaming consoles operating in a LAN-type environment. This is because conventional wireless controllers are added on an ad-hoc basis, rather than in a systematic fashion. As gaming consoles move toward wireless and on-line community environments, the convention ad-hoc nature of wireless gaming will encounter difficulties.

Thus, an improved system of associating wireless controllers to consoles would advance the art and prove advantageous.

SUMMARY

Systems and methods for associating a wireless device to a host. The wireless device is associated to the host via a binding and discovery process. The binding process establishes the association. A unique identifier and other binding information is provided to the wireless device, which is stored in the wireless device to establish the link to the console. The binding information is retained in the wireless device. The discovery process enables the wireless device to join a session at hosted by the host. The host sends broadcast packets that are compared to the stored information in the wireless device. The broadcast packets are validated and authenticated to complete the discovery process. A visual indicator on the host and/or controller may indicate the success or failure of either the binding or discovery process.

Binding and discovery are two individual steps in associating the wireless device to the host. Binding is preferably one-to-one with regard to wireless devices to hosts, however, the there is a one-to-many relationship of hosts to device. Discovery is performed after the device is bound to the host. Discovery may be performed even if a session has already been initiated with other wireless or wired devices.

The wireless device will attempt to retry to connect to the host during the discovery process for a predetermined period of time. This period of time is preferably long enough to allow a user to correct any errors. If wireless device fails to connect, the wireless device will indicate the failure.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION

Figure 1:
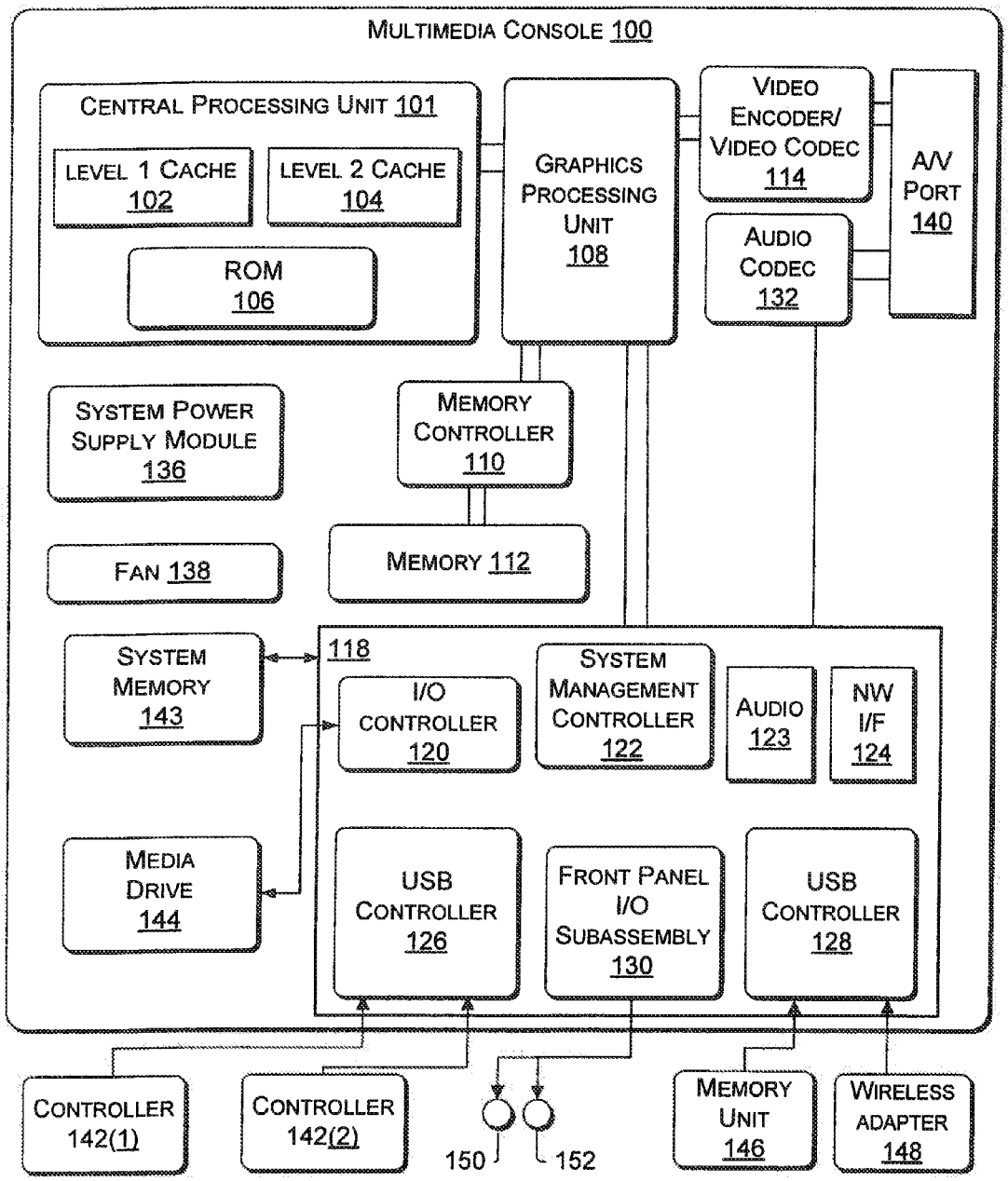
FIG. 1 is a block diagram showing a gaming console in which aspects of the present invention may be implemented.

FIG. 1 illustrates the functional components of a multimedia/gaming console 100 in which certain aspects of the present invention may be implemented. The multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered ON, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a stand-alone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches.

Figure 2:
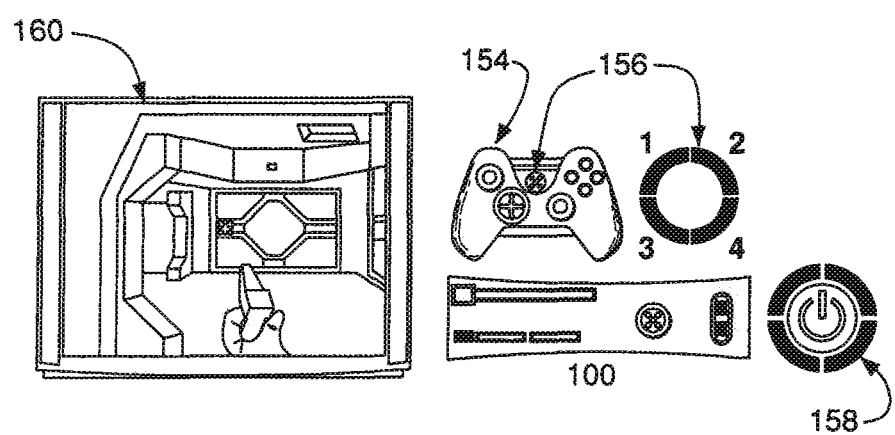
FIG. 2 illustrates a controller and LED indicators.

Referring to FIG. 2, there is illustrated an exemplary wireless controller 154 having a four quadrant LED indicator 156 (and enlarged view) and console 100 having a four quadrant indicator 158. The controller 154 communicates with the wireless adapter 148 via, e.g., a Frequency Hopping Spread Spectrum (FHSS) wireless communication link. The link preferably is able to extend up to 10 meters. The controller 154 also includes vibration feedback, mini joysticks, pressure-sensitive buttons, etc. A game is shown on the screen 160. The console indicator 158 is shown surrounding a power button, however, other configurations may be implemented. Each quadrant of the ring may be illuminated by an LED, which may be either a single color or bi-colored to illuminate in plural colors. As will be described below, the quadrants may be illuminated in patterns indicating the notifications, system status, binding and discovery.

To support an environment where multiple consoles 100 and wireless controllers 154 may coexist, each controller is logically "bound" to a single console 100 so that a link is established with only that console 100. A controller 154 is not bound to more than one console 100 at a time. Binding is the process by which a console 100 transmits information to a controller 154 that will enable that controller to establish a link with the console 100. Once "bound" to a console 100, the controller 154 attempts to establish a link with the console 100 to which it is bound whenever the controller 154 is turned on.

There are four virtual controller ports on the console 100, referred to herein as "Vports." The Vports represent the active game controllers connected to the console 100, either wired or wirelessly. The numbered Vports are automatically assigned to controllers in the order they are connected to the console 100. Each Vport is represented by a quadrant of the LED indicator 156 and the console indicator 158. Thus, "discovery" is the process during which a wired or wireless game device is recognized by the console 100, assigned a Vport, and made available for game play.

Thus, the acts of "binding" and "discovery" are preferably two distinct, but related acts. The act of binding is initiated by pressing the BIND or CONNECT buttons on the controller and console. Once bound, the controller will begin the discovery process, and if successful, will be assigned the first available Vport, which in this case is Vport 1 as described. If one to three controllers had previously been bound and discovered, then the next controller discovered would be assigned Vport 2, 3, or 4 respectively. If, four controllers were already discovered, then the binding process could still be performed, however no Vport would be available to assign, so the controller would not be assigned a Vport, however it would still be bound to the console and available to be discovered if one of the other four controllers were either turned off or bound to a new console.

The processes of binding and discovery will now be described in greater detail with reference to FIGS. 3-6. Binding or connecting is an event that allows new controllers 154 to be added to the console (host) 100. In order to support an environment where multiple wireless controllers 154 and multiple consoles to co-exist in a LAN, each wireless controller 154 is preferably added to a single console at a time. It is further preferable that the single console is the only console to which the wireless controller 154 is connected at a particular time. For most users the binding process is performed only one time per console, unless the user wants to use the same controller with another console. Unbinding controllers from a console 100 is not necessary, as the number of controllers that may be bound to a console is unlimited.

Figure 3:
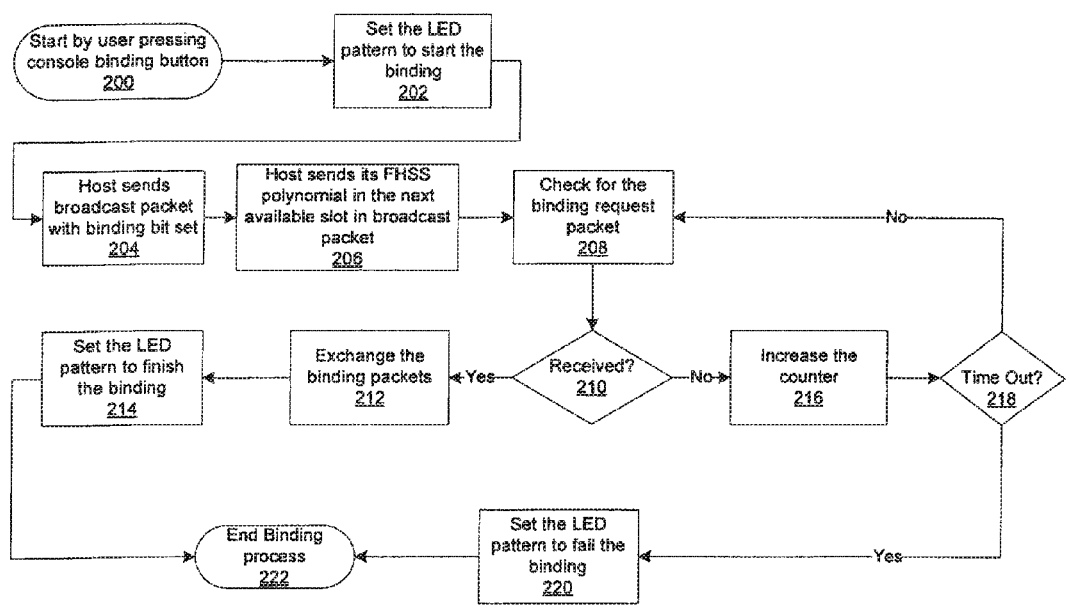
FIGS. 3 and 4 illustrate exemplary processes performed during a binding process.
Figure 4:
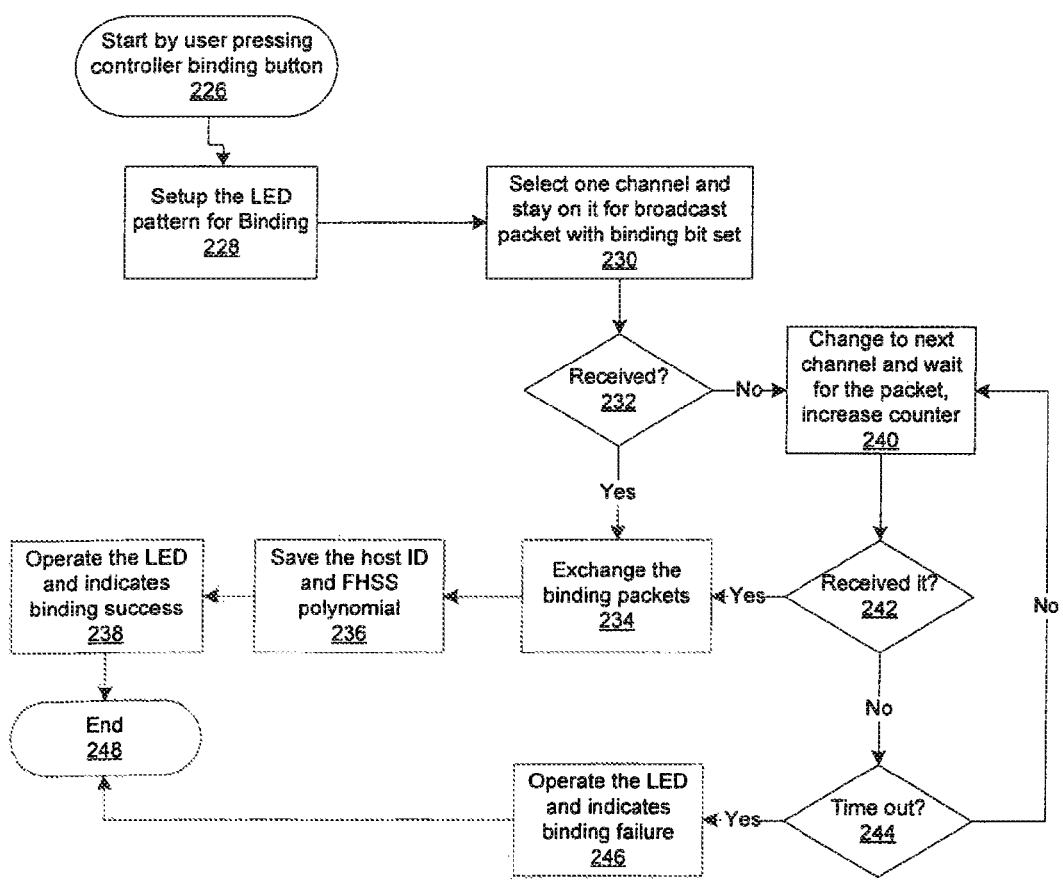

Referring now to FIGS. 3 and 4, the binding or connecting process is initiated by pressing a CONNECT button on the console 100 (step 200) and the CONNECT button on wireless controller 154 (step 226). When each CONNECT button is pressed, each device will stay in this mode until the binding is complete or times-out. Each device will flash an LED pattern to indicate the beginning of the binding process (steps 202, 228). The console 100 will send a broadcast packet with a binding bit and its FHSS hopping polynomial in the next available slot in the broadcast packet (steps 204, 206).

The controller 154 selects a channel and listens for the broadcast packet from the console 100 (step 230). Preferably, within 20 seconds of the pressing of the CONNECT button press on the console 100, the controller 154 will have received the binding packet and can be connected to the console 100. During this period the controller 154 will check to see if the binding packet was received, and change channels and wait for the binding packet on another channel, if necessary (steps 232, 240, 242). Meanwhile, during this period, the console 100 will listen for a binding request packet from the controller 154 (steps 208, 210, 216) The console 100 and controller 154 preferably time-out and exit from the binding mode if no binding information is exchanged between them within 20 seconds (steps 218, 244). The LEDs may be flashed to indicate the failure (steps 220, 246).

After the console and controller radios establish communication, binding packets that contain binding information and verifications are exchanged (steps 212, 234). The controller 154 stores the ID of the console 100 and a FHSS hopping polynomial on an EEPROM provided within the controller 154 (step 236). The LEDs may be flashed to indicate the successful binding (steps 214, 238) and the binding process is complete (steps 222, 248).

As noted above, during the binding process, the controller 154 receives a unique console identification (ID) code and hopping polynomial and stores them in the wireless controller 154. This information is used to establish a link with the console 100 when it is turned on. In terms of the wireless controller, turning on the controller 154 is equivalent to "plugging in" a wired controller to the console. The binding information once stored on the wireless controller 154 is preferably retained even if the batteries or re-chargeable battery pack is removed and also throughout all the discharge/charge cycles. The user, therefore, will not need to re-bind between battery changes or charge cycles with play/charge cable.

In addition, when the controller 154 is bound to a second console, the user will need to re-bind to the first console as the ID and FHSS hopping polynomial will be that of the second. Only one console ID and hopping polynomial can be stored to the controller at a time.

The binding process above does not halt game play on the console 100. When a game is in place, any controller can bind and join without interrupting the game or requiring the play to stop or impacting any voice or data communication of the other controllers.

The binding process may also be initiated by connecting a wireless controller 154 to console 100 using play/charge cable. In this mode, the binding packets are exchanged via the USB cable. The console 100 host sends its wireless module device ID and hopping polynomial to the controller 154, as in the wireless scenario. Upon receiving this information, controller 154 stores them into its EEPROM, establishes the RF link to console 100 automatically and turn on the controller LED indicator (see, FIG. 2) to indicate the connection status.

Some additional features with respect to the binding process are as follows. The dedicated CONNECT or BINDING button on the controller 154 or on the console 100 does not power up the controller or console when pressed. The CONNECT or BINDING button should be pressed and held for more than 0.75 sec. for binding process to be initiated. This is to prevent inadvertent actuation of the button on the controller and console. Binding is a one-to-one event. Pressing the binding button will bind one controller at a time. To bind the next controller, a subsequent user must push the bind button on the console 100 subsequent time before binding or connecting will take place. A status notification screen may display the binding and discovery process (binding . . . bound . . . discovered) to provide feedback to the user. The binding process may be terminated on the wireless controller 154 by pressing the CONNECT button a second time within the 20 sec allocated time. The wireless controller will retain all the information such as ID code of previous console if it is not successful. The entire process of binding is preferably completed within 6.5 sec.

The discovery process enables the wireless controller 154 to join the game session. During the discovery process, device authentication is also performed. The discovery process can be done before or during the game session and it takes place after the device is bound to a console. While the console 100 is in the binding mode, the device discovery process is preferably not enabled.

Figure 5:
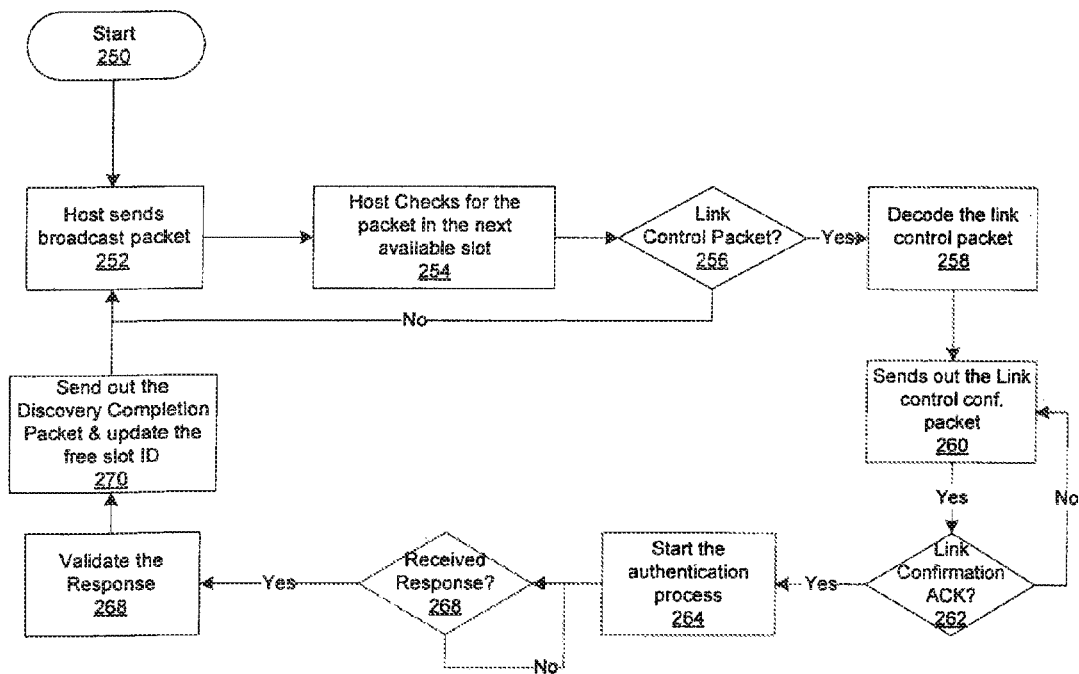
FIGS. 5 and 6 illustrate exemplary processes performed during a discovery process.

The host (console 100) performs the exemplary processes illustrated in FIG. 5. A host (console) broadcast packet is used for discovery process. The console 100 sends out the broadcast packets twice in every frame (steps 250, 252). The console 100 checks the data in the first available slot (step 254). If a valid data link control packet is detected, the console 100 marks that slot occupied and decodes the link control packet (steps 256, 258). If the console 100 does not detect the link control packet, it will send out a discovery complete packet and update its free slot information (step 270) and return to step 252.

If there is a valid link control packet, the console then exchanges the link control packets with controller 154 or other wireless device and acknowledges the link control packets (steps 260, 262). Next, the console 100 initiates an authentication process by sending the transport packets to the wireless controller 154 (step 264). The console 100 waits for the authentication response, validates the response, and sets the flag in its discovery complete packet to indicate the success/failure of the discovery (steps 266, 268). The console 100 completes the process by updating its free slot information in the broadcast packet (step 270) and returns to step 252.

Figure 6:
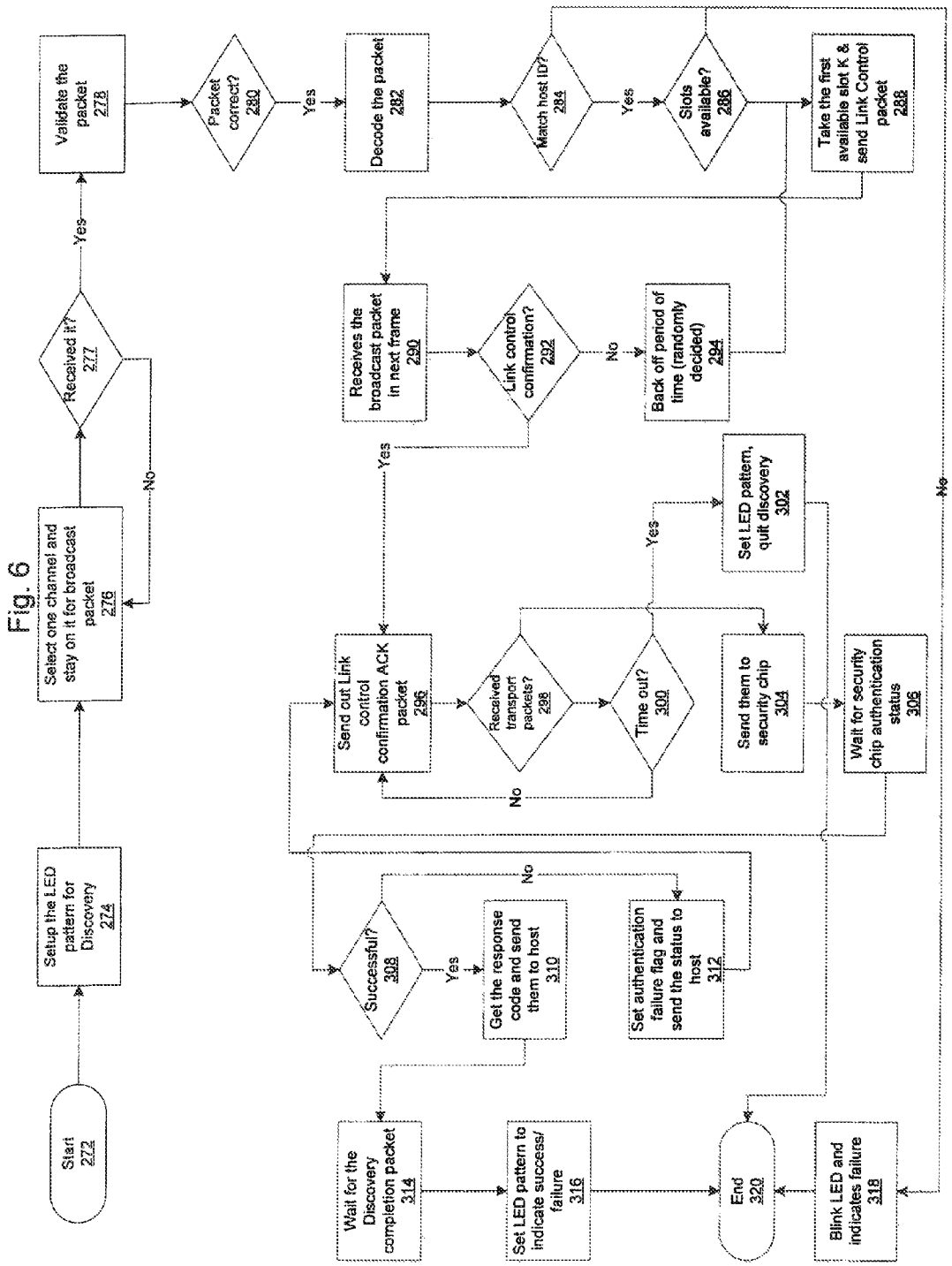

When controller 154 (or any wireless device) joins the game session, it performs the exemplary sequence of FIG. 6. Initially, the controller 154 indicates, via the LEDs, that it is entering the discovery mode (steps 272, 274). Next, the controller 154 selects one channel from the total channel list and listens for the broadcast packet (steps 276, 277). The duration that the device stays on the same hop frequency is approximately 164 ms to provide enough time for host to go through all its possible channels. If no broadcast packet is detected or the packet can not be successfully decoded, the controller 154 moves to another channel and repeats steps 276 and 277.

After receiving the broadcast packet, the controller 154 device performs a host ID validation to join the correct network hosted by its bound host, i.e., console 100. The controller 154 adjusts its timing to match the host 8 ms frame timing and frame counter (steps 278-284). The controller 154 checks the broadcast packet and finds an available slot (step 286). The controller 154 updates its hop channels based on the FHSS/AFH information in broadcast packet and takes the first available slot (step 288). If there is not a match of the host ID at step 284, then the LEDs are illuminated to indicate a failure at step 318 and the process ends (step 320).

The controller sends its link control packet in the next frame (steps 290, 292). If it does not detect a broadcast packet, it will back off a random amount of frames at step 294 and start step 288 again. The controller 154 checks its slot in the host broadcast packet for the ACK bit for the link control packet it sent (step 296).

The controller 154 waits for host transport packets and forwards them to a security mechanism (steps 298-304). If they are not received, then the controller LEDs are illuminated to indicate that a time out period for receipt has elapsed (step 302). The controller 154 polls the security mechanism and waits for the status of the authentication (step 306). Once complete, the controller 154 will forward the status to console 100 via transport packets (steps 308, 310). The controller 154 will not send any data until the authentication is complete (step 312). The controller 154 completes the discovery process and sets a flag LED based on the flag set by the host for the discovery success/failure (steps 314-320).

During the discover process, the controller 154 will preferably try 20 times to connect to the console 100. If it fails to connect, the controller 154 will flash an error message of "no communication" using its LEDs. Each retry may last up to 15 s, and the time from retry fail to new retry start is delayed between 250 ms to 1520 ms. This advantageously provides a retry time for up to 330 s, which provides the user time to correct errors, etc.

It is preferable that if the wireless controller 154 is in a no-connect state, that any input, such as button press or trigger/thumbstick movement causes the controller 154 to initiate its discovery process automatically.

Figure 7:
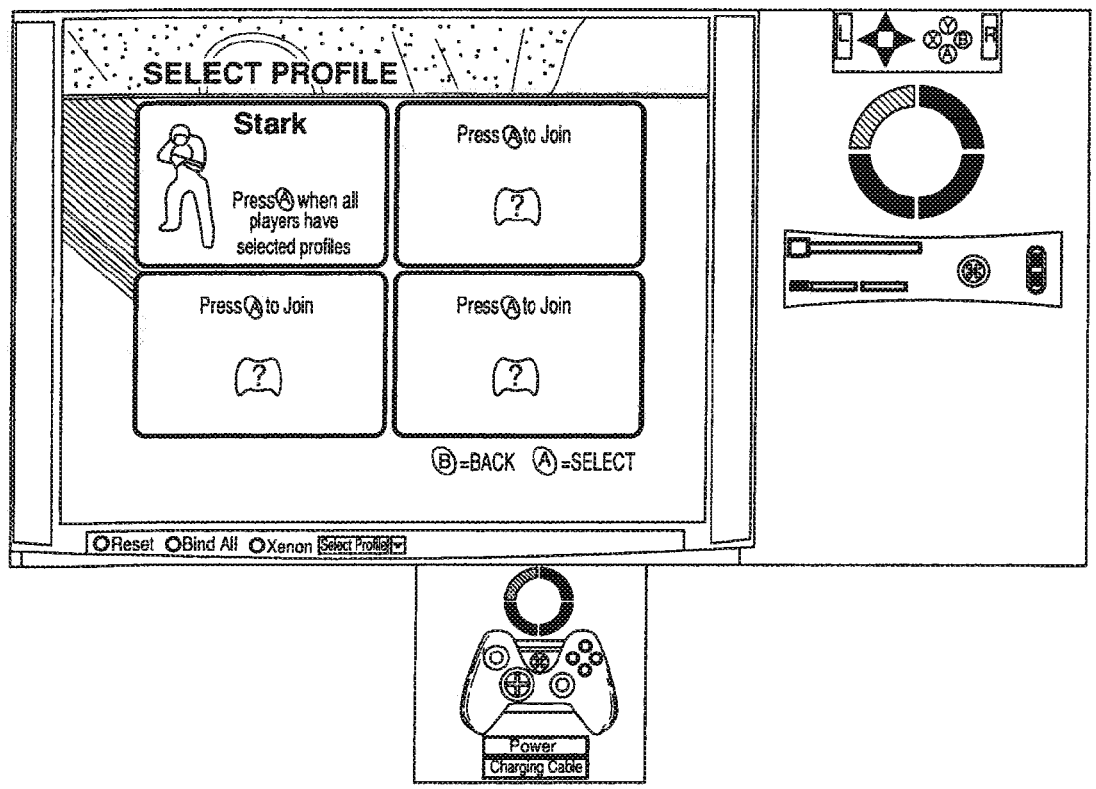
FIGS. 7 and 8 illustrate exemplary notifications and onscreen displays that are conveyed to players.
Figure 8:
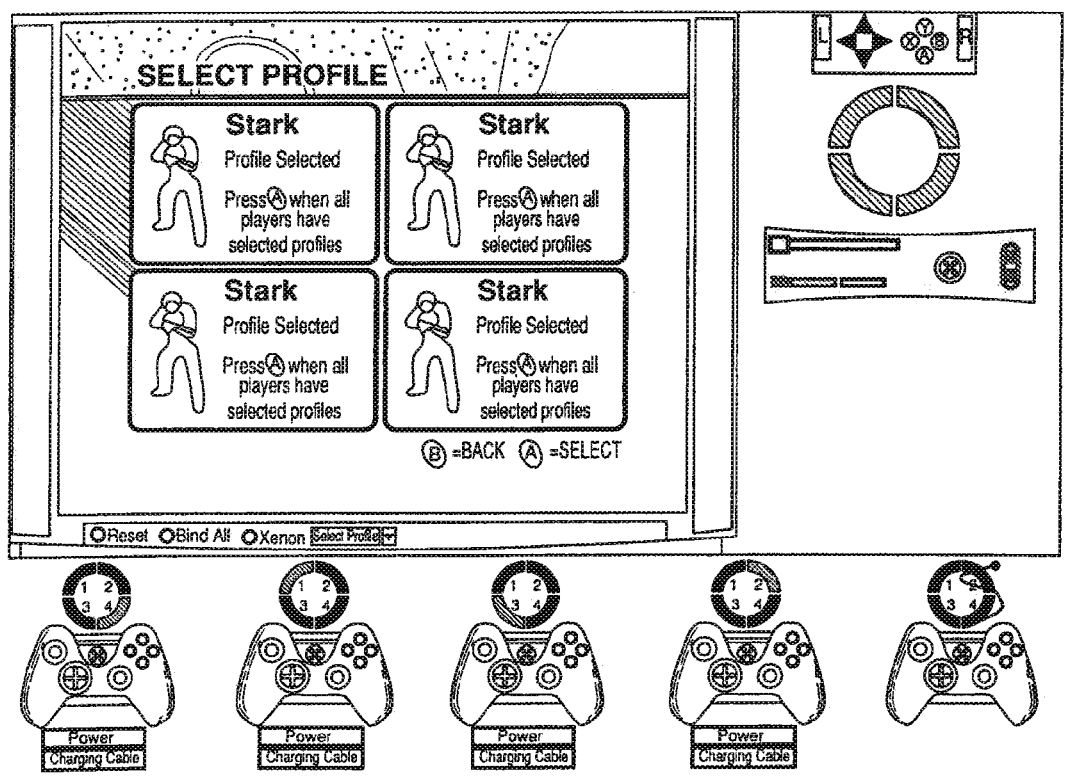

Referring to FIGS. 7 and 8, there is a visualization of the binding and discovery processes and how the LED indicator 156 and the console indicator 158 visually convey the processes to players. As shown in FIG. 3, the controller has been powered on and the BIND button on the console 100 and the controller have been pressed. After the binding process has completed, the discovery process takes place. Because this is the first controller to be discovered by the console 100, it is associated with Vport 1 and the top left quadrant of the indicators 156 and 158 will illuminate to signal the connection. As shown in FIG. 8, if more than one controller is discovered by the console 100, the other quadrants of indicator 158 are illuminated in succession. Thus, if two controllers are connected, two quadrants of the indicator 158 will illuminate, and so on up to four controllers and four quadrants. It is noted that while additional quadrants are successively illuminated on the console, only a single quadrant is illuminated on any single controller at a time.

The position of the quadrant preferably corresponds to the Vport as follows:
1, top left quadrant
2, top right quadrant
3, lower left quadrant
4, lower right quadrant
In addition, as shown in FIG. 8, where multiple players are playing, the position of the players on the screen correspond to the quadrant assigned to their particular controller.

Vports are preferably assigned in ascending order (1 through 4), according to the following rules:
If the system is powered up by a controller, that controller (wired or wireless) is assigned Vport 1.
Wired controllers plugged into the console are automatically assigned the next available Vport According to the following order:
Controllers connected via hub to USB Port A.

Controller directly plugged into USB Port A (e.g., controller 142(1)).

Controllers connected via hub to USB Port B.

Controller directly plugged into USB Port B (e.g., controller 142(2)).

Controllers connected via hub to USB Port C

Controller directly plugged into USB Port C

Vports are vacated as controllers are unplugged or powered off. Logically, a wireless controller that is powered off is treated the same as a wired controller that is unplugged from the console 100. Once powered-up, the console 100 will assign additional wired and wireless controllers to available Vports in the order in which they are connected or powered up. During game play, the game will be notified when a controller is unplugged. In the event that the controller that is unplugged is currently being used in the game, the game will pause and display a disconnect message. The game also notifies the console 100 that the vacated Vport is the next to be repopulated should a controller be reconnected. Should subsequent disconnects occur, the console notifies the game and the game reports back with the next Vport to populate. The console maintains in a Last-In-First-Out stack for the next Vport assignment requested by the game.

Thus, as controllers are reconnected, they are assigned to Vports according to the following rules:

If a Next Vport stack has a value in it, the controller is assigned to the specified Vport and the Vport is popped off the stack.

If the Next Vport stack is empty, the controller is assigned to the lowest numbered vacant Vport.

If no there are no vacant Vports, then the controller is not assigned a Vport. If the controller is wireless, it displays the failure to connect display and is powered down. If the controller is wired, no quadrant is illuminated on the controller.

The present invention is designed to provide users with a simple, consistent way in which to add and remove controllers from the console. While the present invention has been described in connection with the preferred embodiments of the various Figs., it is to be understood that other similar embodiments may be used or modifications and additions may be made to the described embodiment for performing the same function of the present invention without deviating therefrom.

What is claimed:

1. A controller, comprising:
one or more processors;
memory coupled to the one or more processors, wherein the memory stores computer-executable instructions causing the controller to:
receive a user input to establish wireless communication with a console, wherein the user input begins a binding process to associate the controller with the console;
receive a console unique identifier from the console, wherein the console unique identifier is retained in the memory when power to the controller is lost such that the controller is not required to re-bind with the console when power is restored, wherein the console unique identifier is associated with frequency hopping information used for the wireless communication; and
perform a discovery process after the binding process that associates the controller with one of a plurality of virtual controller ports on the console.

2. The controller of claim 1, wherein the console unique identifier is received from the console during the binding process.

3. The controller of claim 1, wherein the binding process comprises selecting a frequency hopping channel based on the console unique identifier and waiting for a broadcast packet.

4. The controller of claim 3, wherein upon receipt of the broadcast packet, the controller exchanges binding packets with the console.

5. The controller of claim 1, wherein the instructions are further executable to capture a broadcast packet from the console and correlate an identifier in the broadcast packet to the console unique identifier stored in the controller.

6. The controller of claim 5, wherein the instructions are further executable to implement a retry mechanism to retry the discovery process if the broadcast packet is not received within a predetermined period of time, the retry mechanism retrying a predetermined number of times.

7. The controller of claim 5, wherein the instructions are further executable to authenticate the broadcast packet received from the console.

8. The controller of claim 1, wherein the controller indicates a success or failure of the binding process by illuminating a visual indicator on the controller.

9. The controller of claim 8, wherein the visual indicator indicates which virtual controller port the controller is associated with.

10. The controller of claim 1, wherein the discovery process is performed when the controller is turned on.

11. A method of associating a wireless controller to a console, comprising:
actuating a connection process;
performing a binding process to associate the wireless controller to the console in a one-to-one relationship;
storing in memory of the wireless game controller, a console unique identifier to enable the wireless controller to establish a communication link with the console, wherein the console unique identifier is retained in the memory of the wireless controller when power is lost from and then restored to the wireless controller such that the wireless controller is not required to re-bind with the console when power is restored, and wherein the console unique identifier is associated with frequency hopping information used for the communication link; and
performing a discovery process that occurs after the binding process to join the wireless controller to a session with the console, wherein the discovery process associates the wireless controller with one of a plurality of virtual controller ports on the console.

12. The method of claim 11, wherein the console unique identifier is provided to the wireless controller during the binding process.

13. The method of claim 11, further comprising maintaining the one-to-one relationship in the wireless controller using the console unique identifier.

14. The method of claim 11, further comprising retrying the discovery process if a broadcast packet is not received within a predetermined period of time.

15. The method of claim 11, further comprising:
capturing a broadcast packet from the console; and
correlating a console unique identifier in the broadcast packet to the console unique identifier stored in the wireless controller.

16. A device, comprising:
an input; and
a processor configured to:
in response to operation of the input, begin a binding process to associate the device with the console;

receive a console unique identifier from the console, wherein the console unique identifier is retained in the memory when power to the device is lost such that the device is not required to re-bind with the console when power is restored, wherein the console unique identifier is associated with frequency hopping information used for the wireless communication; and perform a discovery process after the binding process that associates the device with one of a plurality of virtual ports on the console.

17. The device of claim 16, wherein the input is a button.

18. The device of claim 16, wherein the device indicates a success or failure of the binding process by illuminating a visual indicator on the device.

19. The device of claim 18, wherein the visual indicator indicates which virtual port the device is associated with.

20. The device of claim 16, wherein the console unique identifier is received from the console during the binding process.

* * * * *